United States Patent
Nakamura (10) Patent No.: US 10,534,691 B2
(45) Date of Patent: Jan. 14, 2020

(54) APPARATUS AND METHOD TO IMPROVE ACCURACY OF PERFORMANCE MEASUREMENT FOR LOOP PROCESSING IN A PROGRAM CODE

(71) Applicant: FUJITSU LIMITED, Kawasaki-shi, Kanagawa (JP)

(72) Inventor: Tomotake Nakamura, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/873,559

(22) Filed: Jan. 17, 2018

(65) Prior Publication Data
US 2018/0217918 A1 Aug. 2, 2018

(30) Foreign Application Priority Data

Jan. 27, 2017 (JP) ................................ 2017-013450
Oct. 10, 2017 (JP) ................................ 2017-196846

(51) Int. Cl.
| | | |
|---|---|---|
| G06F 11/36 | (2006.01) | |
| G06F 11/34 | (2006.01) | |
| G06F 8/30 | (2018.01) | |
| G06F 8/41 | (2018.01) | |

(52) U.S. Cl.
CPC ...... *G06F 11/3612* (2013.01); *G06F 11/3466* (2013.01); *G06F 11/3692* (2013.01); *G06F 11/3696* (2013.01); *G06F 8/30* (2013.01); *G06F 8/425* (2013.01)

(58) Field of Classification Search
CPC ............ G06F 11/1423; G06F 11/3608; G06F 11/3409; G06F 11/3604

USPC ......................................................... 717/127
See application file for complete search history.

(56) References Cited

U.S. PATENT DOCUMENTS

| | | | | |
|---|---|---|---|---|
| 5,950,003 | A * | 9/1999 | Kaneshiro ............... | G06F 8/443 714/E11.2 |
| 6,088,525 | A * | 7/2000 | Peri ..................... | G06F 11/3612 712/233 |
| 8,527,624 | B2 * | 9/2013 | Chen ................... | G06F 11/3466 709/223 |
| 2009/0077351 | A1 * | 3/2009 | Nakaike ............... | G06F 1/3203 712/220 |
| 2010/0306733 | A1 * | 12/2010 | Bordelon ............... | G06F 8/433 717/106 |
| 2013/0067441 | A1 * | 3/2013 | Lafreniere ............... | G06F 8/41 717/139 |

(Continued)

FOREIGN PATENT DOCUMENTS

| | | |
|---|---|---|
| JP | 05-241915 | 9/1993 |
| JP | 2004-326760 | 11/2004 |

*Primary Examiner* — Wei Y Zhen
*Assistant Examiner* — Brahim Bourzik
(74) *Attorney, Agent, or Firm* — Fujitsu Patent Center (57) ABSTRACT

An apparatus, for a first loop included in a program code, determines whether an inner loop is included in the first loop. When the inner loop is included in the first loop, the apparatus determines whether a processing code other than the inner loop is included in the first loop. When both the inner loop and the processing code other than the inner loop are included in the first loop or when no inner loop is included in the first loop, the apparatus adds a performance measurement code for conducting performance measurement of the first loop to the program code.

8 Claims, 11 Drawing Sheets

(56) References Cited

U.S. PATENT DOCUMENTS

2014/0181591 A1* 6/2014 Bijanki ............... G06F 11/3684
                                                    714/38.1
2016/0139901 A1* 5/2016 Margiolas ............... G06F 8/456
                                                    717/150
2017/0371761 A1* 12/2017 Piga .................... G06F 9/45516

* cited by examiner

| filename | start | end |
| --- | --- | --- |
| a.c | 0x03 | 0x10 |
| b.c | 0x11 | 0x20 |

FIG. 5A

```
            filename a.c
ROW ADDRESS
            int main() {
  0x03        for () {
  0x04          for () {
  0x05            ...
  0x06          }
  0x07          for () {
  0x08            ...
  0x09          }
  0x0a        }
  0x0b        for () {
  0x0c          ...
  0x0d        }
  0x0e        for () {
  0x0f          ...
  0x10        }
  0x11
  0x12      }
```

FIG. 5B

| a.c  | a.c  | a.c  |      |
|------|------|------|------|
| 0x03 | 0x0b | 0x0e |      |
| 0x0a | 0x0d | 0x10 |      |

FIG. 5C

| a.c  | a.c  | a.c  | a.c  |
|------|------|------|------|
| 0x0b | 0x0e | 0x04 | 0x07 |
| 0x0d | 0x10 | 0x06 | 0x09 |

- WHEN INNER LOOP IS INCLUDED AND PROCESSING CODE OTHER THAN INNER LOOP IS NOT INCLUDED IN OUTER LOOP, SET TRGT OF INNER LOOP AT ON AND
SET TRGT OF OUTER LOOP AT OFF

```
→  for () {    // loop#1
       a=b+c
       for () {    // loop#2
→        for () {    // loop#3
             ...
→        }
       }
→  }
```

FIG. 9B

- WHEN INNER LOOP IS INCLUDED AND PROCESSING CODE OTHER THAN INNER LOOP IS NOT INCLUDED IN OUTER LOOP AND WHEN TWO OR MORE INNER LOOPS ARE INCLUDED,
SET TRGT OF INNER LOOPS AT ON AND SET TRGT OF OUTER LOOP AT OFF

- WHEN ONE INNER LOOP IS INCLUDED, SET TRGT OF INNER LOOP AT OFF AND SET TRGT OF OUTER LOOP AT ON

```
→  for () {    // loop#1
       a=b+c
→      for () {    // loop#2
          for () {    // loop#3
             ...
          }
→      }
→  }
```

APPARATUS AND METHOD TO IMPROVE ACCURACY OF PERFORMANCE MEASUREMENT FOR LOOP PROCESSING IN A PROGRAM CODE

CROSS-REFERENCE TO RELATED APPLICATIONS

This application is based upon and claims the benefit of priority of the prior Japanese Patent Application No. 2017-196846, filed on Oct. 10, 2017, and the prior Japanese Patent Application No. 2017-13450, filed on Jan. 27, 2017, the entire contents of which are incorporated herein by reference.

FIELD

The embodiments discussed herein are related to apparatus and method to improve accuracy of performance measurement for loop processing in a program code.

BACKGROUND

In developing programs, processing time taken for loop processing in programs, such as for loops, while loops, and do-while loops, may be measured and programs may be tuned according to the results of the measurement. Particularly in the field of high performance computing (HPC), such turning is often performed so as to increase the speeds of programs.

In a related-art technique, invoking of a program, branching of control, loop constructs, and the like are analyzed and variable loop information where the number of loops changes with change in value of the number of pieces of input data or the number of dimensions of an array is displayed, and based on dynamic characteristics information and assumed values of variable data, predictive execution information is calculated. Such a technique may reduce execution time taken in performing dynamic analysis.

In another related-art technique, the execution speed of a program may be raised and the storage capacity of memory for storing a program may be saved by accurately selecting part of a source program which is executed many times or may probably be executed many times and compiling the selected part.

Examples of the related art include Japanese Laid-open Patent Publication No. 5-241915 and Japanese Laid-open Patent Publication No. 2004-326760.

SUMMARY

According to an aspect of the invention, an apparatus, for a first loop included in a program code, determines whether an inner loop is included in the first loop. When the inner loop is included in the first loop, the apparatus determines whether a processing code other than the inner loop is included in the first loop. When both the inner loop and the processing code other than the inner loop are included in the first loop or when no inner loop is included in the first loop, the apparatus adds a performance measurement code for conducting performance measurement of the first loop to the program code.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 12:
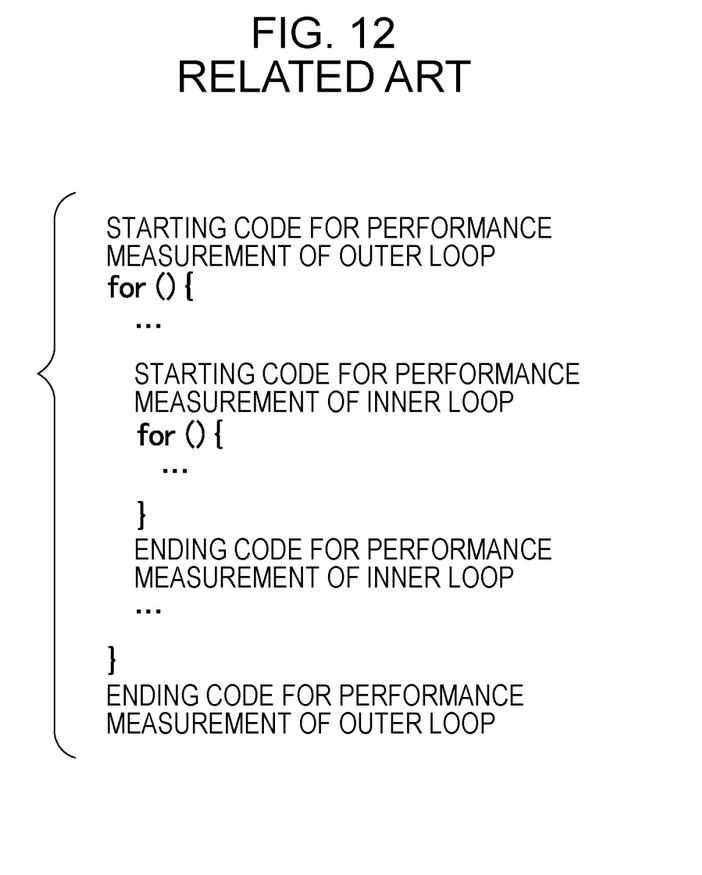
FIG. 12 is a diagram for explaining a problem relating to performance measurement of an outer loop.

When performance measurement is conducted on loop processing of a program, a problem may arise that performance measurement codes of an inner loop affect performance measurement of an outer loop. FIG. 12 is a drawing for explaining such a problem relating to performance measurement of an outer loop. FIG. 12 illustrates a case where an inner loop, which is a for loop, is inside an outer loop, which is a for loop.

As illustrated in FIG. 12, codes for conducting performance measurement of the inner loop are constituted of a starting code for the performance measurement immediately before the for loop of the inner loop and an ending code for the performance measurement immediately after the for loop of the inner loop. These codes are included in the for loop of the outer loop. Thus, a performance measurement value of the outer loop includes processing time for the performance measurement codes of the inner loop and is larger than that in a case where the performance measurement of the inner loop is not conducted.

It is desirable to decrease the degree of influence of the performance measurement codes of an inner loop on the performance measurement of an outer loop.

Embodiments of a compilation program, a compilation method, and a parallel processor disclosed by the present application are described in detail below by referring to the drawings. The embodiments are not intended to limit the technique disclosed herein.

First Embodiment

Figure 1:
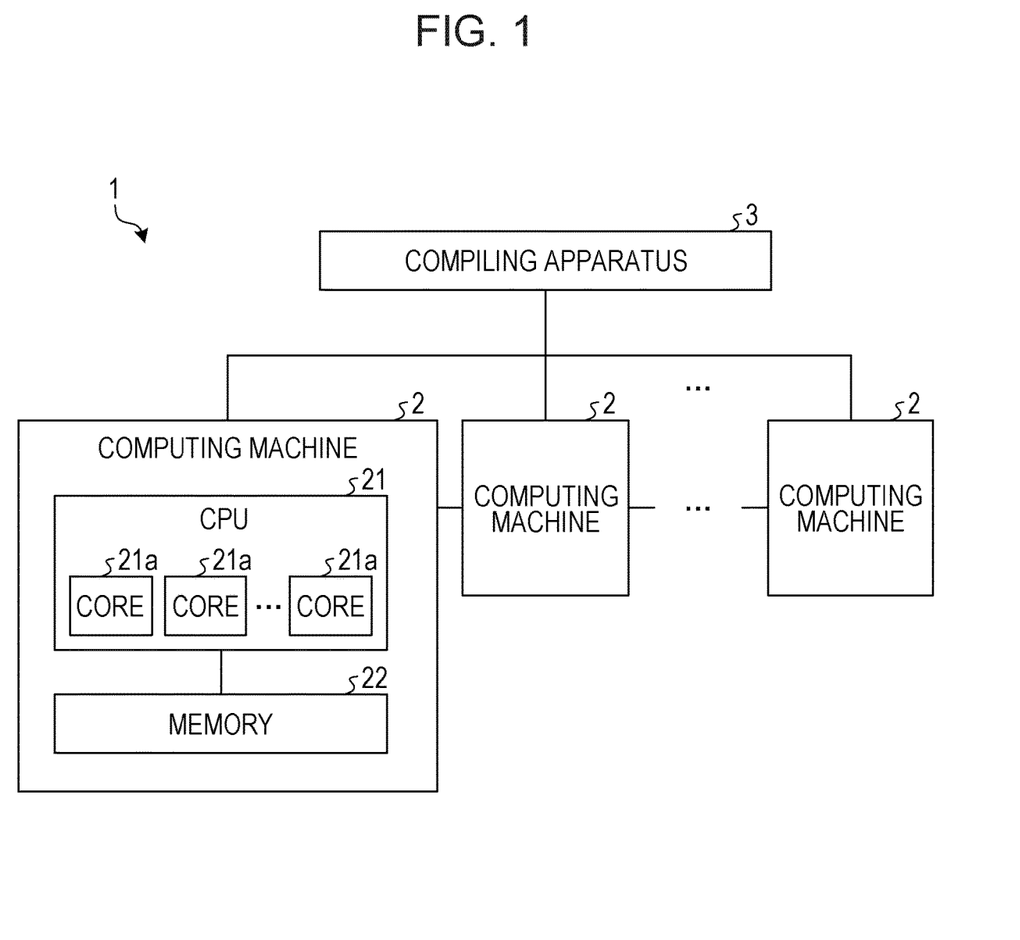
FIG. 1 is a diagram illustrating an example of a structure of a parallel processor according to an embodiment.

A structure of a parallel processor 1 according to a first embodiment is described first. FIG. 1 illustrates the structure of the parallel processor 1 according to the first embodiment. As illustrated in FIG. 1, the parallel processor 1 according to the first embodiment includes a plurality of computing machines 2 and a compiling apparatus 3. The plurality of computing machines 2 are arranged one-dimensionally and coupled in sequence through a network. Each computing machine 2 is coupled to the compiling apparatus 3 through the network.

Although a case where the plurality of computing machines 2 are arranged one-dimensionally is taken for convenience of explanation, the plurality of computing machines 2 may be in an arrangement of dimensions of a higher number, which is for example a two-dimensional arrangement, a three-dimensional arrangement, or a six-dimensional arrangement. The arrangement of the plurality of computing machines 2 is like a mesh or a torus.

Each computing machine 2 includes a central processing unit (CPU) 21 and a memory 22. The CPU 21 reads a program from the memory 22 and executes the program. Although the CPU 21 includes a plurality of cores 21a in FIG. 1, the CPU 21 may include only one core 21a. The memory 22 is a volatile storage device that stores a program, the results of a program being executed, and the like.

The compiling apparatus 3 compiles a program that is executed on the computing machines 2 and transmits the program to the computing machines 2. When a user designates performance measurement of a loop, the compiling apparatus 3 inserts codes for conducting the performance measurement of the loop into the program.

Figure 2:
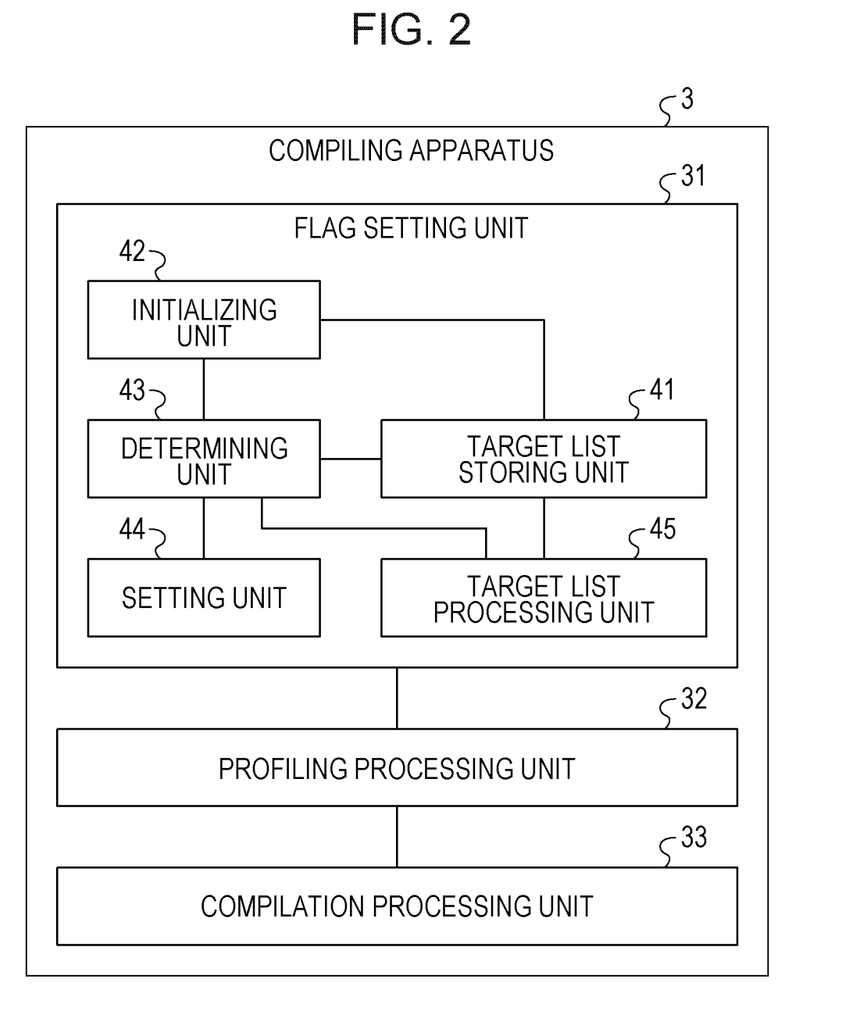
FIG. 2 is a diagram illustrating an example of a functional structure of a compiling apparatus.

FIG. 2 illustrates a functional structure of the compiling apparatus 3. As illustrated in FIG. 2, the compiling apparatus 3 includes a flag setting unit 31, a profiling processing unit 32, and a compilation processing unit 33.

The flag setting unit 31 sets TRGT where TRGT represents a flag that indicates whether to add a code for conducting performance measurement for each loop. When TRGT is ON, a code for conducting performance measurement is added and when TRGT is OFF, the code for performance measurement is not added.

Figure 3A:
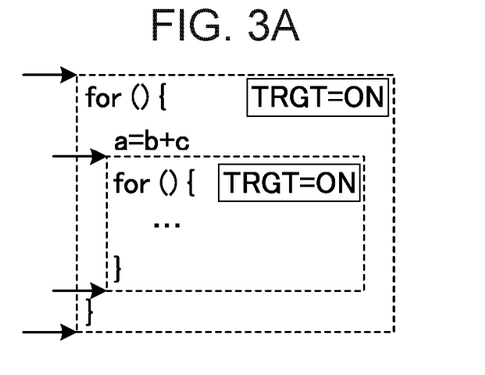
FIGS. 3A and 3B are diagrams for explaining TRGT.
Figure 3B:
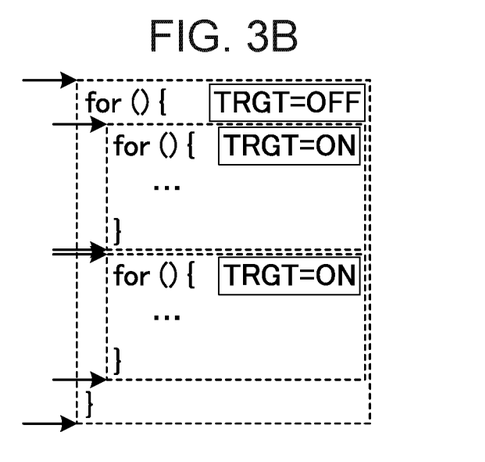

FIGS. 3A and 3B are drawings for explaining TRGT. FIG. 3A illustrates an example where a processing code other than an inner loop is included in an outer loop. In FIG. 3A, the processing code other than the inner loop in the outer loop is indicated as "a=b+c". FIG. 3B illustrates an example where a processing code other than inner loops is not included in an outer loop.

As illustrated in FIG. 3A, when a processing code other than an inner loop is included in an outer loop, the flag setting unit 31 sets both TRGT of the outer loop and TRGT of the inner loop at ON. In contrast, when a processing code other than inner loops is not included in an outer loop, as illustrated in FIG. 3B, the flag setting unit 31 sets TRGT of the inner loops at ON and sets TRGT of the outer loop at OFF.

When a processing code other than an inner loop is not included in an outer loop, processing time of the outer loop may be calculated by measuring processing time of the inner loop. Thus, the flag setting unit 31 sets TRGT of the outer loop at OFF.

The flag setting unit 31 includes a target list storing unit 41, an initializing unit 42, a determining unit 43, a setting unit 44, and a target list processing unit 45.

Figure 4:
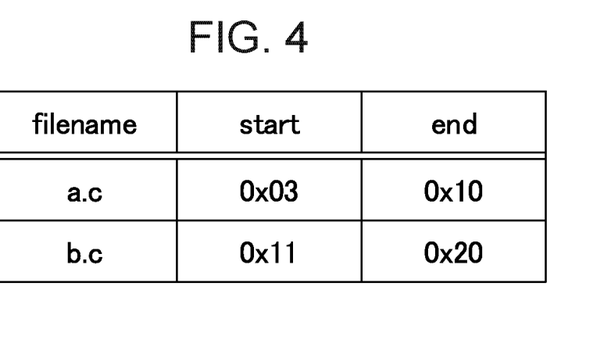
FIG. 4 is a diagram illustrating an example of a target list storing unit.

The target list storing unit 41 stores a target list, which is a list of loops for which TRGT is set. FIG. 4 illustrates an example of the target list storing unit 41. As illustrated in FIG. 4, the target list storing unit 41 stores "filename", "start", and "end" for each loop.

The "filename" indicates the name of a file in which a program including loops is stored. The "start" indicates the starting step address of a loop. The "end" indicates the ending step address of a loop. For example, the program stored in a file "a.c" includes a loop that starts at "0x03" and ends at "0x10". Here, "0x" indicates a hexadecimal number.

The initializing unit 42 performs initialization desired for setting TRGT. Specifically, the initializing unit 42 sets TRGT at OFF for each loop. Further, the initializing unit 42 registers all loops having no loop outside in the target list.

For each loop registered in the target list, the determining unit 43 determines whether an inner loop is included therein and when an inner loop is included therein, determines whether a processing code other than the inner loop is included therein.

When the determining unit 43 determines that no inner loop is included in a loop x or when the determining unit 43 determines that an inner loop is included in the loop x and a processing code other than the inner loop is included therein, the setting unit 44 sets TRGT of the loop x at ON. The loop x represents a loop included in the target list.

When an inner loop is included in the loop x, the target list processing unit 45 registers the inner loop in the target list. Further, when a process for the loop x ends, the target list processing unit 45 deletes the loop x off the target list.

Figure 5A:
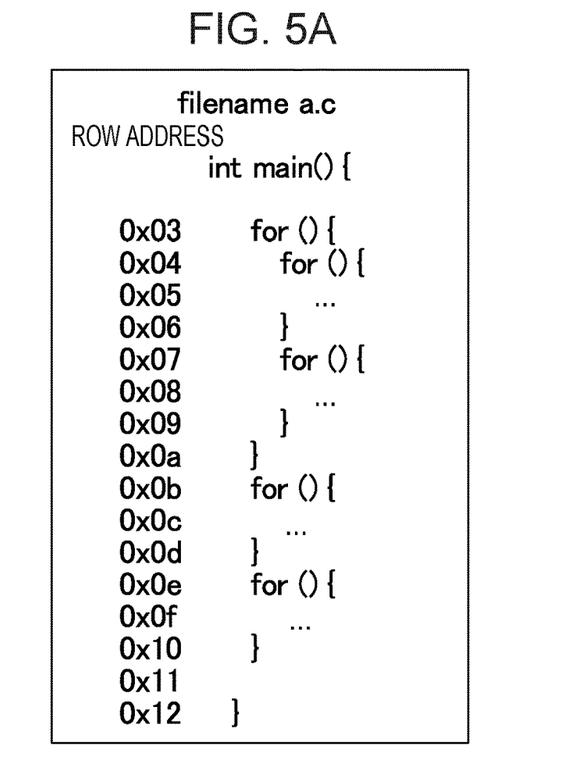
FIGS. 5A to 5C are diagrams illustrating an example of change in state of the target list.
Figure 5B:
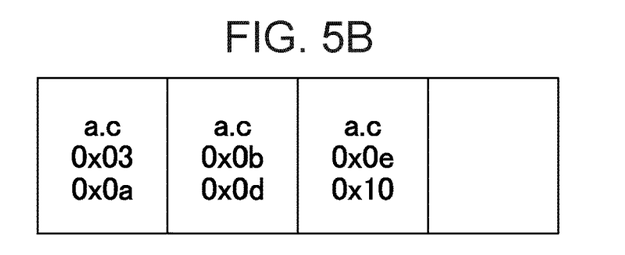
Figure 5C:
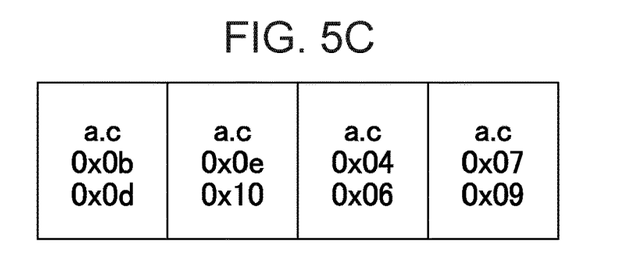

FIGS. 5A to 5C illustrate an example of change in state of the target list. FIG. 5A illustrates a program as a subject of the performance measurement, FIG. 5B illustrates an initial state of the target list, and FIG. 5C illustrates the state of the target list after checking a loop whose starting row is "0x03". The program as the subject of the performance measurement is stored in the file "a.c"

As illustrated in FIG. 5A, the program as the subject of the performance measurement includes three loops as loops, none of which has a loop outside and whose respective starting steps are "0x03", "0x0b", and "0x0e". Accordingly, as illustrated in FIG. 5B, the initial target list includes loops where "0x03" is the starting step and "0x0a" is the ending step, a loop where "0x0b" is the starting step and "0x0d" is the ending step, and a loop where "0x0e" is the starting step and "0x10" is the ending step.

In the target list after checking the loop where "0x03" is the starting step, as illustrated in FIG. 5C, a loop where "0x04" is the starting step and "0x06" is the ending step and a loop where "0x07" is the starting step and "0x09" is the ending step are added. The loop where "0x03" is the starting step is deleted off the target list.

The profiling processing unit 32 adds codes for conducting performance measurement of a loop. The profiling processing unit 32 adds codes for conducting performance measurement with respect to a loop for which TRGT is set at ON and does not add the codes for conducting performance measurement with respect to a loop for which TRGT is set at OFF.

The compilation processing unit 33 compiles a program and generates object codes. That is, the compilation processing unit 33 performs lexical analysis, syntactic analysis, optimization, code generation, and the like and generates object codes. When codes for conducting performance measurement of a loop are added, the compilation processing unit 33 performs the compilation on the added codes inclusively.

Figure 6:
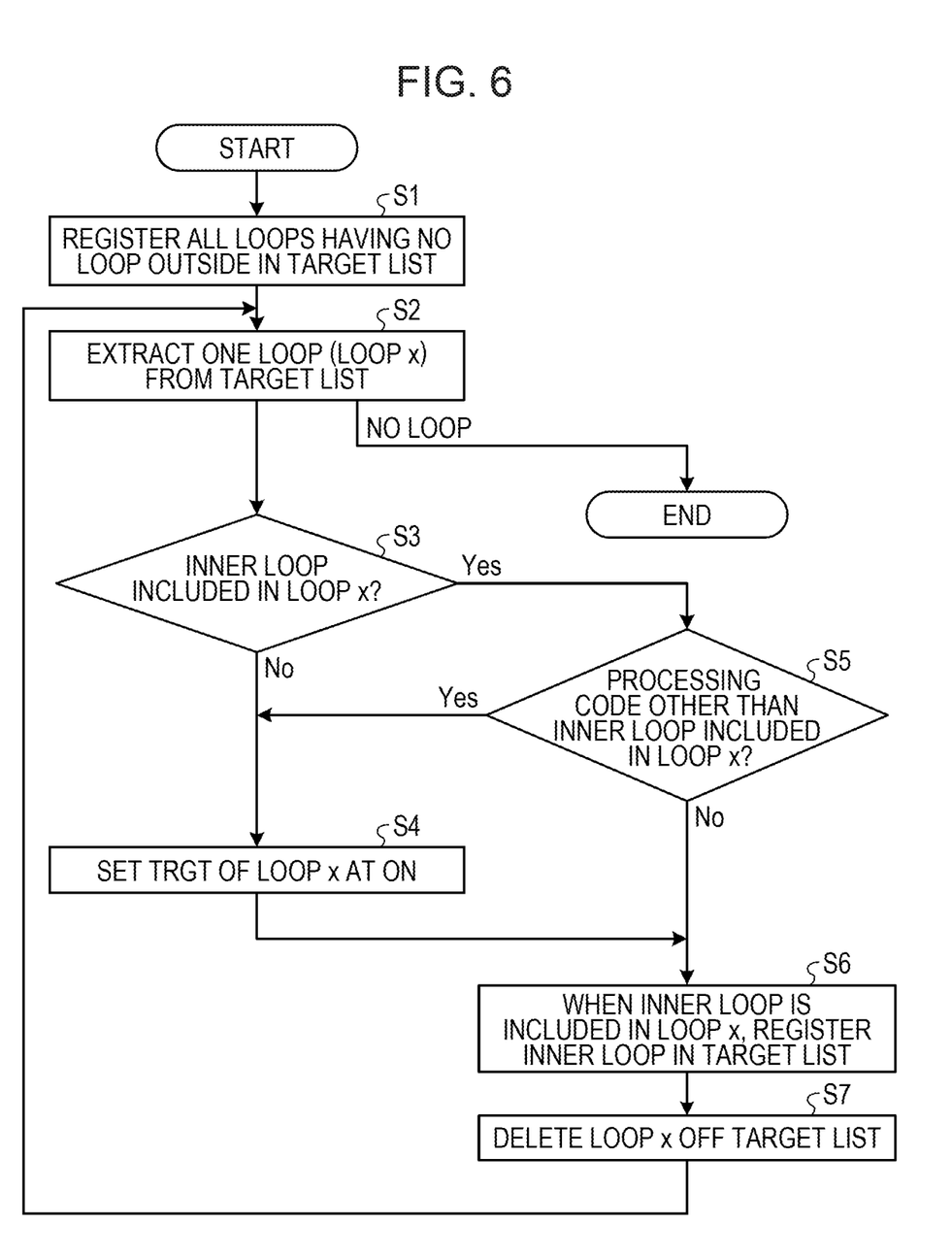
FIG. 6 is a diagram illustrating an example of an operational flowchart for a process by a flag setting unit.

An operational sequence in a process performed by the flag setting unit 31 is described below. FIG. 6 is an operational flowchart that illustrates the sequence in the process by the flag setting unit 31. In FIG. 6, every TRGT is set at OFF initially.

As illustrated in FIG. 6, the flag setting unit 31 registers all loops having no loop outside in the target list (step S1). After that, the flag setting unit 31 extracts one loop from the target list (step S2). The extracted loop is here referred to as a loop x. When no loop is in the target list, the flag setting unit 31 ends the process.

After that, the flag setting unit 31 determines whether an inner loop is included in the loop x (step S3), and when no inner loop is included in the loop x, TRGT of the loop x is set at ON (step S4) and the flag setting unit 31 moves to step S6.

In contrast, when an inner loop is included in the loop x, the flag setting unit 31 determines whether a processing code other than the inner loop is included in the loop x (step S5), and when the processing code other than the inner loop is included in the loop x, the flag setting unit 31 moves to step S4. When the processing code other than the inner loop is not included in the loop x, the flag setting unit 31 moves to step S6.

After that, when an inner loop is included in the loop x, the flag setting unit 31 registers the inner loop in the target list (step S6) and deletes the loop x off the target list (step S7). Subsequently, the flag setting unit 31 returns to step S2.

Thus, the flag setting unit 31 may reduce unwanted performance measurement codes to be added, by setting TRGT at ON only when no inner loop is included in the loop x or only when an inner loop is included in the loop x and a processing code other than the inner loop is included therein.

Figure 7A:
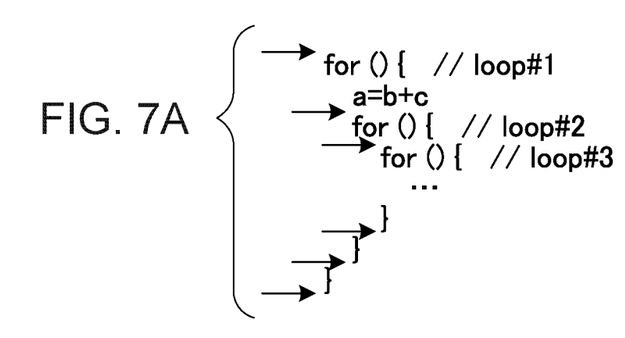
FIGS. 7A and 7B are diagrams for explaining advantages of a compiling apparatus.
Figure 7B:
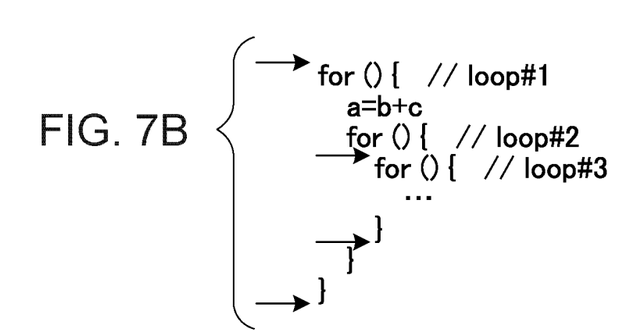

Advantages of the compiling apparatus 3 are described below. FIGS. 7A and 7B are drawings for explaining the advantages of the compiling apparatus 3. FIG. 7A illustrates conventional addition of performance measurement codes and FIG. 7B illustrates addition of performance measurement codes by the compiling apparatus 3 according to the first embodiment. The arrows indicate the locations where performance measurement codes are added.

As illustrated in FIG. 7A, typically, performance measurement codes are added with respect to three loops, which are loop #1 to loop #3. In contrast, the compiling apparatus 3 adds performance measurement codes with respect to loop #1 and loop #3 while the compiling apparatus 3 adds no performance measurement codes with respect to loop #2 since in loop #2, an inner loop is included and a processing code other than the inner loop is not included.

As described above, in the first embodiment, the determining unit 43 determines whether, for a loop included in a program, an inner loop is included in the loop and when the determining unit 43 determines that an inner loop is included therein, determines whether a processing code other than the inner loop is included in the loop. After that, only when the determining unit 43 determines that an inner loop and a processing code other than the inner loop are included in the loop or when the determining unit 43 determines that no inner loop is included in the loop, the setting unit 44 sets TRGT of the loop at ON. After that, the profiling processing unit 32 adds performance measurement codes with respect to the loop for which TRGT is set at ON. Thus, the compiling apparatus 3 may reduce the degree of influence of the performance measurement codes of an inner loop on the performance measurement of an outer loop.

Since in the first embodiment, the target list processing unit 45 registers an inner loop included in a loop x, as a subject of determination by the determining unit 43, in the target list, the determining unit 43 may determine whether to add performance measurement codes for all nested loops.

Although the first embodiment describes the compiling apparatus 3, a compilation program having similar functions may be obtained by implementing the configuration of the compiling apparatus 3 using software. Described below is a computer that executes such a compilation program.

Figure 8:
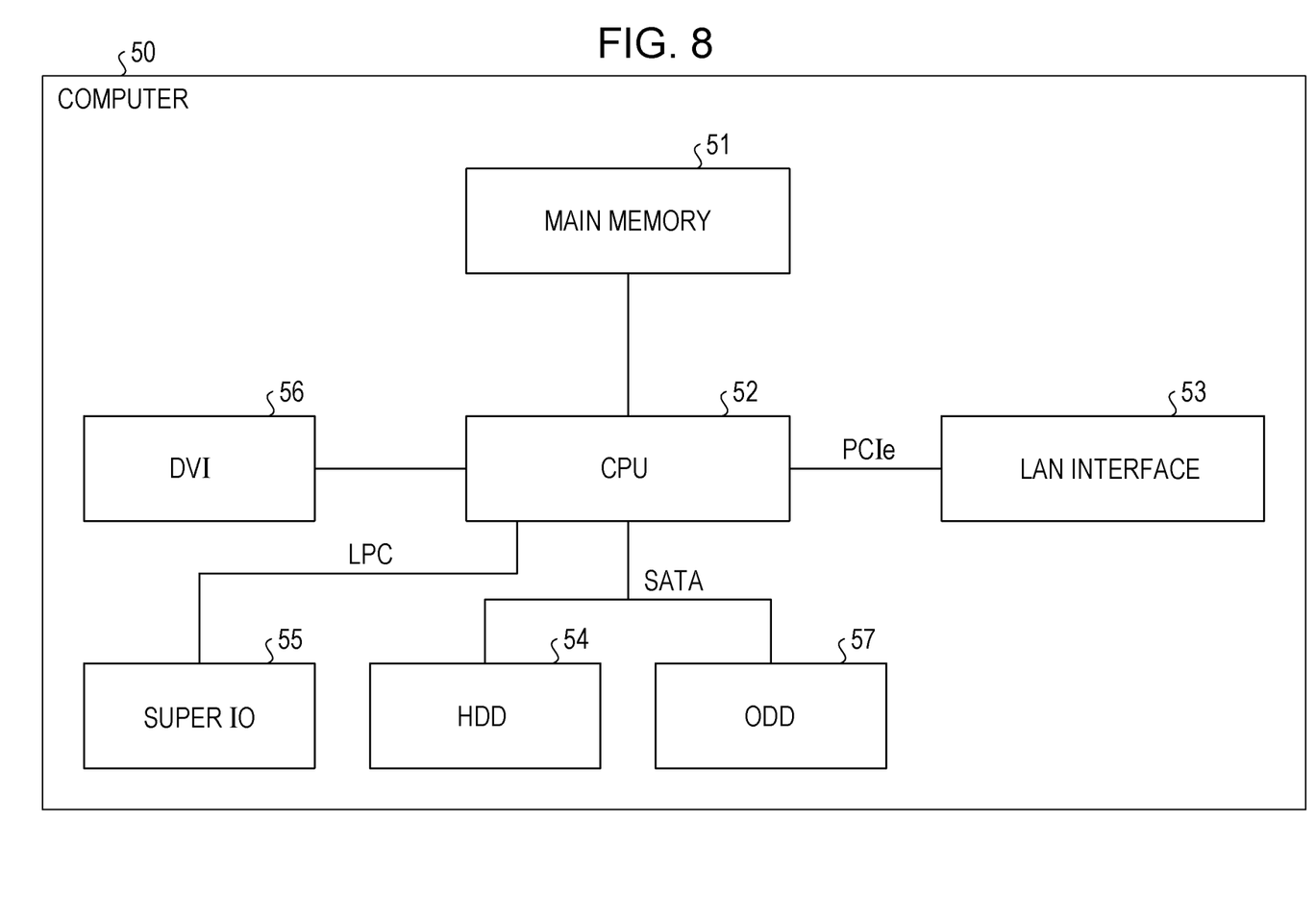
FIG. 8 is a diagram illustrating an example of a hardware configuration of a computer that executes a compilation program according to an embodiment.

FIG. 8 illustrates a hardware configuration of a computer 50 that executes a compilation program according to the first embodiment. As illustrated in FIG. 8, the computer 50 includes a main memory 51, a CPU 52, a local area network (LAN) interface 53, and a hard disk drive (HDD) 54. Further, the computer 50 includes a super input/output (IO) 55, a digital visual interface (DVI) 56, and an optical disk drive (ODD) 57.

The main memory 51 stores a program, results of a program being executed, and the like. The CPU 52 reads a program from the main memory 51 and executes the program. The CPU 52 includes a chip set with a memory controller.

The LAN interface 53 is an interface for coupling the computer 50 to other computers via a LAN. The HDD 54 is a disk device that stores a program and data for example, and the super IO 55 is an interface for coupling input devices, such as a mouse and a keyboard. The DVI 56 is an interface that couples a liquid crystal display and the ODD 57 is a device that performs reading and writing on a digital versatile disc (DVD).

The LAN interface 53 is coupled to the CPU 52 through a peripheral component interconnect express (PCIe), and the HDD 54 and the ODD 57 are coupled to the CPU 52 through a serial advanced technology attachment (SATA). The super IO 55 is coupled to the CPU 52 through a low pin count (LPC).

The compilation program that is executed on the computer 50 is stored in a DVD and read from the DVD by the ODD 57 to be installed on the computer 50. Alternatively, the compilation program is stored in a database of another computer system or the like, which is coupled through the LAN interface 53, and read from such a database and the like to be installed on the computer 50. The installed compilation program is stored in the HDD 54 and read by the main memory 51 to be executed by the CPU 52.

Although the first embodiment describes a case where the flag setting unit 31 and the profiling processing unit 32 operate as part of compilation, the present application is not limited thereto but the flag setting unit 31 and the profiling processing unit 32, or the flag setting unit 31 may be caused to operate as preprocessing of the compilation.

Although the first embodiment describes a case where performance measurement of a program for parallel computing machines is conducted, the present application is not limited thereto but may similarly be applied to a case where for example, performance measurement of a program for another computing machine is conducted, such as a single computing machine.

Second Embodiment

In the first embodiment, when an outer loop includes only one inner loop, which is called a tight loop, performance measurement codes are inserted for the inner loop and thus, the performance measurement codes are executed for the number of loop rotations of the outer loop and overhead of the performance measurement is large. In a tight loop, the processing time of the inner loop may be estimated from the processing time of the outer loop and the number of loop rotations of the outer loop. So a second embodiment describes a compiling apparatus 3, where in a case of a tight loop, performance measurement codes are inserted for an outer loop instead of an inner loop.

Figure 9A:
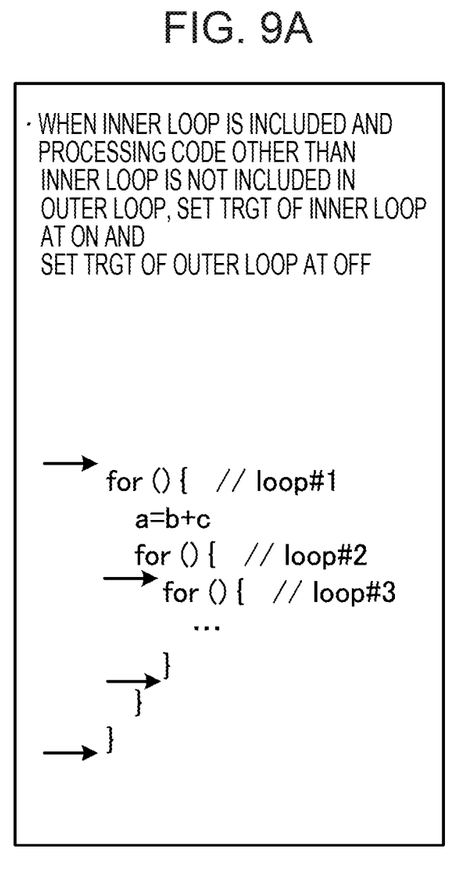
FIGS. 9A and 9B are diagrams for explaining differences in locations where performance measurement codes are inserted between a first embodiment and a second embodiment.
Figure 9B:
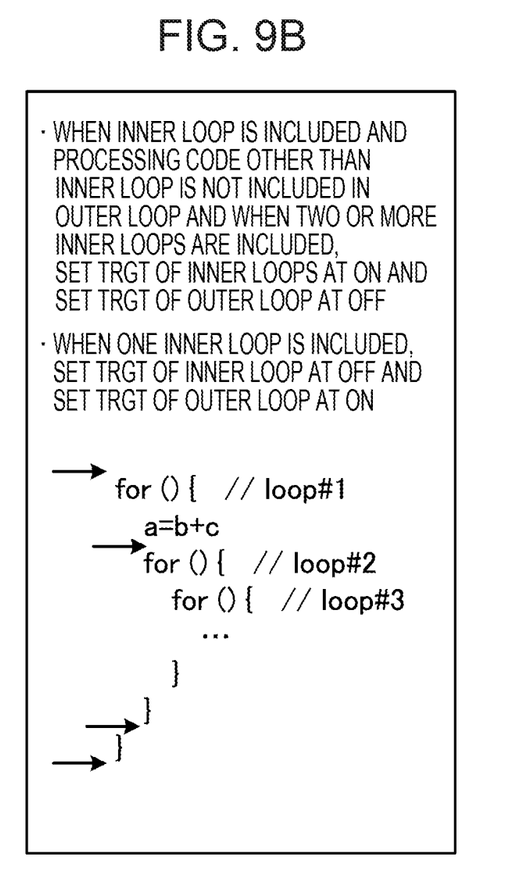

FIGS. 9A and 9B are drawings for explaining differences in locations where performance measurement codes are inserted between the first embodiment and the second embodiment. In each of FIGS. 9A and 9B, loop #2 is a tight loop where loop #3 is an inner loop. In the first embodiment, when an inner loop is included and a processing code other than the inner loop is not included in an outer loop, the compiling apparatus 3 sets TRGT of the inner loop at ON and sets TRGT of the outer loop at OFF. Thus, as illustrated in FIG. 9A, performance measurement codes are inserted for loop #3 and no performance measurement codes are inserted for loop #2.

In contrast, in the second embodiment, when an inner loop is included and a processing code other than the inner loop is not included in an outer loop and when the number of inner loops is two or more, the compiling apparatus 3 sets TRGT of the inner loops at ON and sets TRGT of the outer loop at OFF. Further, when an inner loop is included and a processing code other than the inner loop is not included in an outer loop and when the number of inner loops is one, the compiling apparatus 3 sets TRGT of the inner loop at OFF and sets TRGT of the outer loop at ON. Accordingly, as illustrated in FIG. 9B, performance measurement codes are inserted for loop #2 and no performance measurement codes are inserted for loop #3.

In this manner, in the second embodiment, when an inner loop is included and a processing code other than the inner loop is not included in an outer loop and when the number of inner loops is one, the compiling apparatus 3 sets TRGT of the inner loop at OFF and sets TRGT of the outer loop at ON. As a result, the compiling apparatus 3 may prevent performance measurement codes from being executed for the number of loop rotations of the outer loop and reduce overhead of performance measurement.

Figure 10:
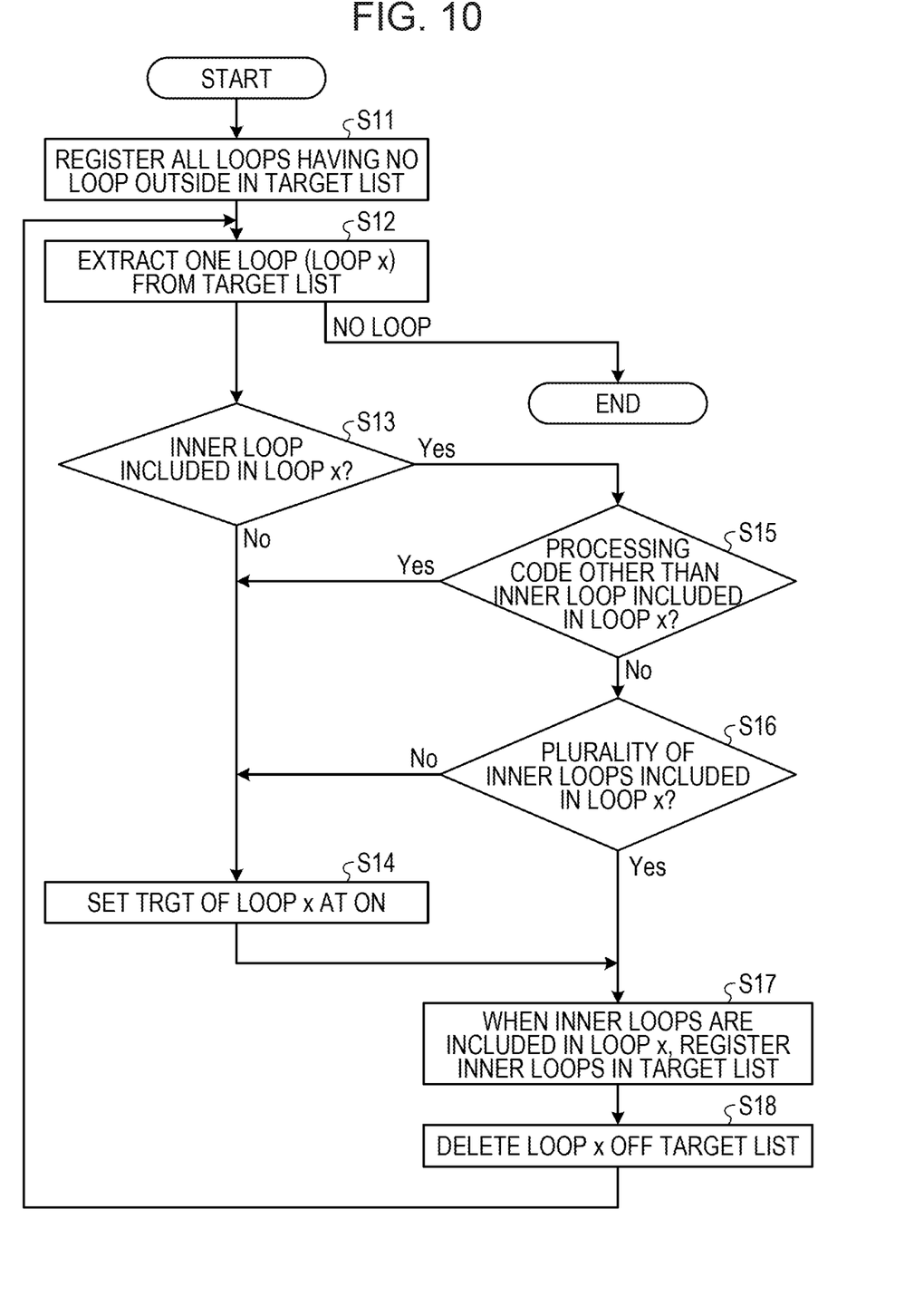
FIG. 10 is a diagram illustrating an example of an operational flowchart for a first process by a flag setting unit.
Figure 11:
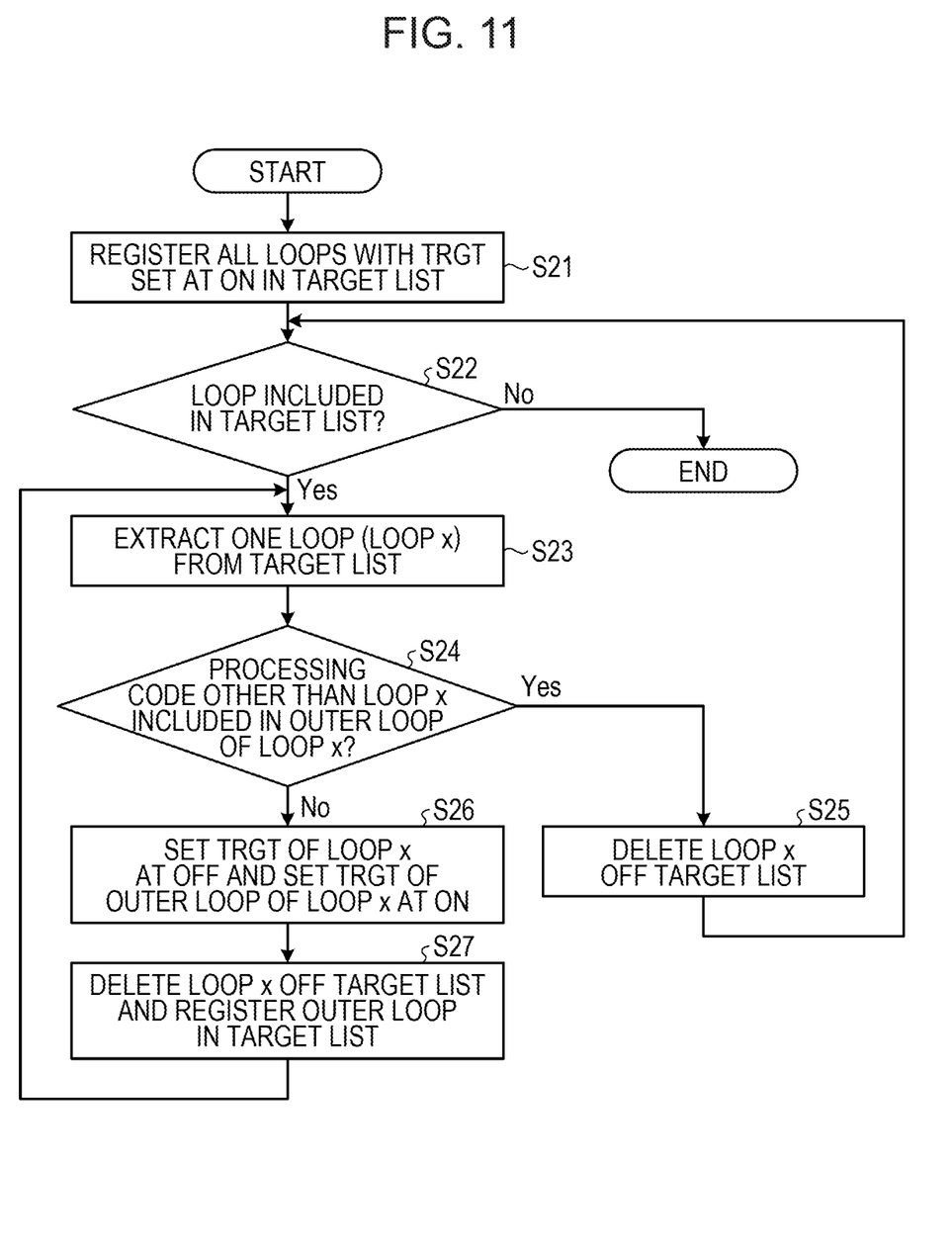
FIG. 11 is a diagram illustrating an example of an operational flowchart for a second process by the flag setting unit.

The second embodiment is different from the first embodiment only in process by the flag setting unit 31. Described below are the operational sequences in the process by the flag setting unit 31. FIG. 10 is an operational flowchart that illustrates the sequence in a first process by the flag setting unit 31 and FIG. 11 is an operational flowchart that illustrates the sequence in a second process by the flag setting unit 31. After performing the process illustrated in FIG. 10, the flag setting unit 31 performs the process illustrated in FIG. 11.

As illustrated in FIG. 10, the flag setting unit 31 registers all loops having no loop outside in a target list (step S11). After that, the flag setting unit 31 extracts one loop from the target list (step S12). The extracted loop is here referred to as a loop x. When the target list includes no loop, the flag setting unit 31 ends the first process.

The flag setting unit 31 determines whether an inner loop is included in the loop x (step S13) and when no inner loop is included in the loop x, the flag setting unit 31 sets TRGT of the loop x at ON (step S14) and moves to step S17.

When an inner loop is included in the loop x, the flag setting unit 31 determines whether a processing code other than the inner loop is included in the loop x (step S15) and when the processing code other than the inner loop is included in the loop x, the flag setting unit 31 moves to step S14. When the processing code other than the inner loop is not included in the loop x, the flag setting unit 31 determines whether a plurality of inner loops are included in the loop x (step S16). When a plurality of inner loops are not included in the loop x, the flag setting unit 31 moves to step S14, and when a plurality of inner loops are included in the loop x, the flag setting unit 31 moves to step S17.

When inner loops are included in the loop x, the flag setting unit 31 registers the inner loops in the target list (step S17) and deletes the loop x off the target list (step S18). Subsequently, the flag setting unit 31 returns to step S12.

When the first process ends, as illustrated in FIG. 11, the flag setting unit 31 registers all loops for which TRGT is set at ON in the target list (step S21). After that, the flag setting unit 31 determines whether the target list includes a loop (step S22) and when the target list includes no loop, the flag setting unit 31 ends the process.

When the target list includes a loop, the flag setting unit 31 extracts one loop from the target list (step S23). The extracted loop is here referred to as a loop x. After that, the flag setting unit 31 determines whether a processing code other than the loop x is included in the outer loop of the loop x (step S24), and when the processing code other than the loop x is included in the outer loop of the loop x, the flag setting unit 31 deletes the loop x off the target list (step S25) and returns to step S22.

When the processing code other than the loop x is not included in the outer loop of the loop x, the flag setting unit 31 sets TRGT of the loop x at OFF and sets TRGT of the outer loop of the loop x at ON (step S26). After that, the flag setting unit 31 deletes the loop x off the target list and registers the outer loop in the target list (step S27). Subsequently, the flag setting unit 31 returns to step S23.

In this manner, when a processing code other than the loop x is not included in the outer loop of the loop x, the flag setting unit 31 sets TRGT of the loop x at OFF and sets TRGT of the outer loop of the loop x at ON. Thus, in a tight loop, the compiling apparatus 3 may insert performance measurement codes for an outer loop instead of an inner loop.

As described above, in the second embodiment, since with respect to a tight loop, the compiling apparatus 3 inserts performance measurement codes for an outer loop instead of an inner loop, the compiling apparatus 3 may prevent performance measurement codes from being executed for the number of loop rotations of the outer loop. Thus, the compiling apparatus 3 may reduce overhead of performance measurement.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:
   registering, in a target list, loops which are included in a program code and each of which has no loop outside the loop, the target list being configured to store identification information identifying a loop to be processed;
   repeating a determination process until no loop is registered in the target list, the determination process including:
   selecting a first loop from among loops registered in the target list;

determining whether an inner loop is included in the first loop;

when an inner loop is included in the first loop, determining whether a processing code other than the inner loop is included in the first loop;

when both the inner loop and the processing code other than the inner loop are included in the first loop or when no inner loop is included in the first loop, adding a performance measurement code for conducting performance measurement of the first loop to the first loop in the program code; and updating the target list by registering the inner loop included in the first loop in the target list and deleting the first loop from the target list.

2. The non-transitory, computer-readable recording medium of claim 1, wherein the adding the performance measurement code includes:

setting a flag that indicates addition of the performance measurement code for the first loop, and adding the performance measurement code in accordance with the set flag.

3. The non-transitory, computer-readable recording medium to claim 1, the determination process further comprising:

when an inner loop is included in the first loop and the processing code other than the inner loop is not included in the first loop, determining whether a plurality of inner loops are included in the first loop; and when the plurality of inner loops are not included in the first loop, adding the performance measurement code for conducting the performance measurement of the first loop to the first loop in the program code.

4. A method comprising:

registering, in a target list, loops which are included in a program code and each of which has no loop outside the loop, the target list being configured to store identification information identifying a loop to be processed;

repeating a determination process until no loop is registered in the target list, the determination process including:

selecting a first loop from among loops registered in the target list;

determining whether an inner loop is included in the first loop;

when the inner loop is included in the first loop, determining whether a processing code other than the inner loop is included in the first loop;

when both the inner loop and a processing code other than the inner loop are included in the first loop or when no inner loop is included in the first loop, adding a performance measurement code for conducting performance measurement of the first loop to the first loop in the program code; and updating the target list by registering the inner loop included in the first loop in the target list and deleting the first loop from the target list.

5. An apparatus comprising:

a memory; and a processor coupled to the memory and configured to:

register, in a target list, loops which are included in a program code and each of which has no loop outside the loop, the target list being configured to store loop information identifying a loop to be processed; and repeat a determination process until no loop is registered in the target list, the determination process including:

selecting a first loop among loops registered in the target list;

determining whether an inner loop is included in the first loop;

when the inner loop is included in the first loop, determining whether a processing code other than the inner loop is included in the first loop;

when both the inner loop and the processing code other than the inner loop are included in the first loop or when no inner loop is included in the first loop, adding a performance measurement code for conducting performance measurement of the first loop to the first loop in the program code; and updating the target list by registering the inner loop included in the first loop in the target list and deleting the first loop from the target list.

6. The apparatus of claim 5, wherein the loop information comprises a filename, starting address, and ending address.

7. The non-transitory, computer-readable recording medium of claim 1, wherein the loop information comprises a filename, starting address, and ending address.

8. The method of claim 4, wherein the loop information comprises a filename, starting address, and ending address.

* * * * *